June 20, 1961  G. A. LYON  2,989,345
WHEEL COVER
Filed July 27, 1956  2 Sheets-Sheet 1
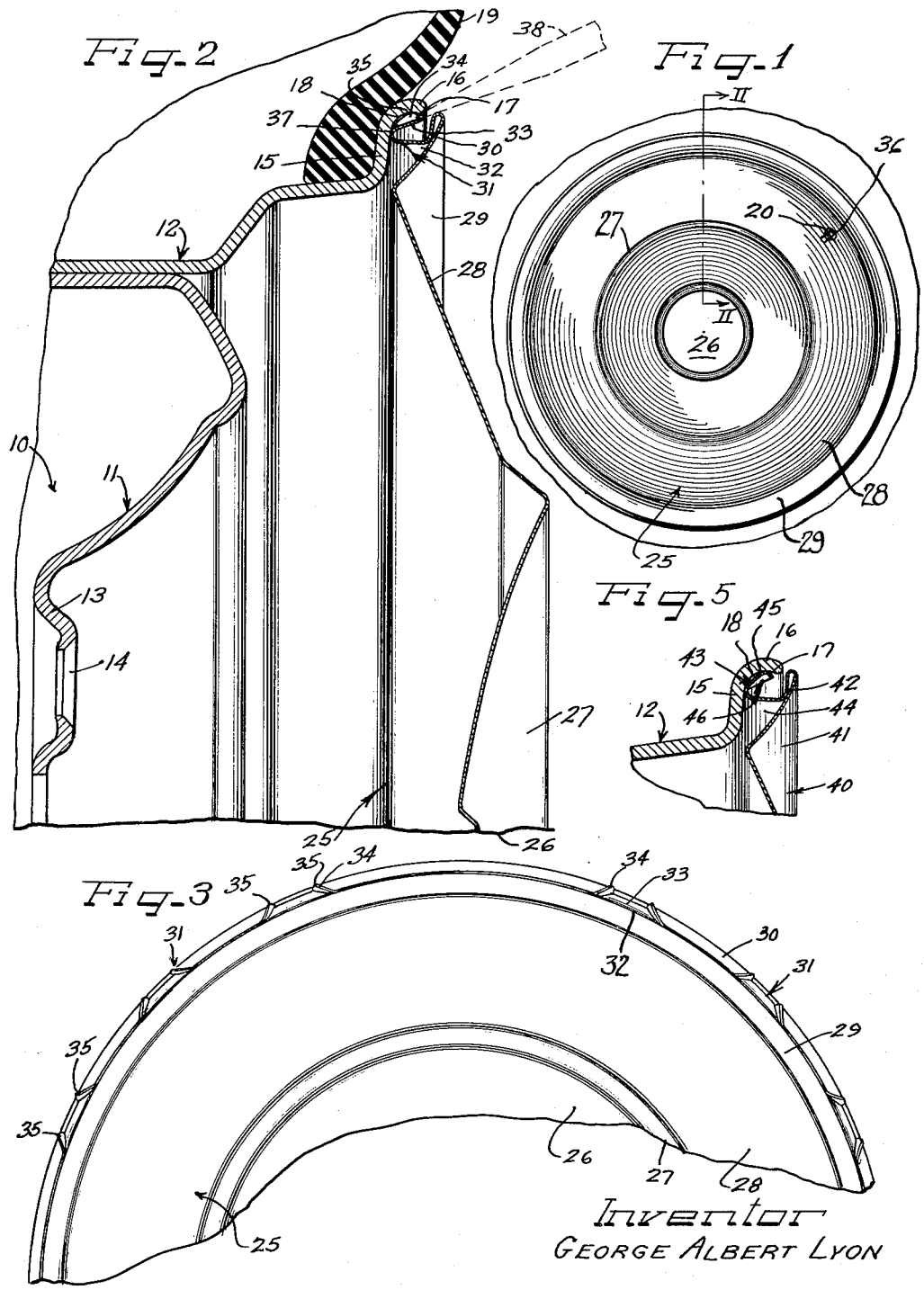
Inventor
GEORGE ALBERT LYON
by Hill, Sherman, Meroni, Gross & Simpson
Attys.

June 20, 1961
G. A. LYON
2,989,345
WHEEL COVER
Filed July 27, 1956
2 Sheets-Sheet 2
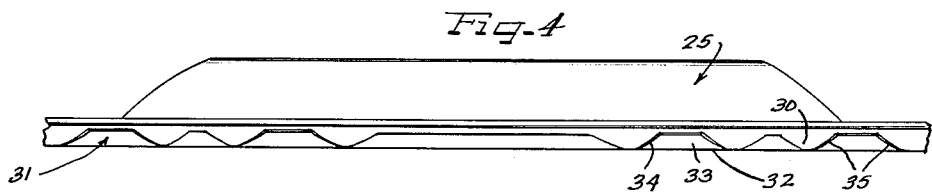
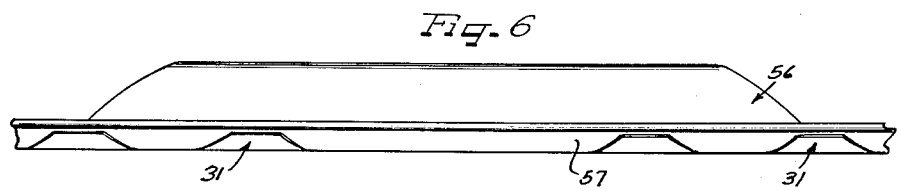
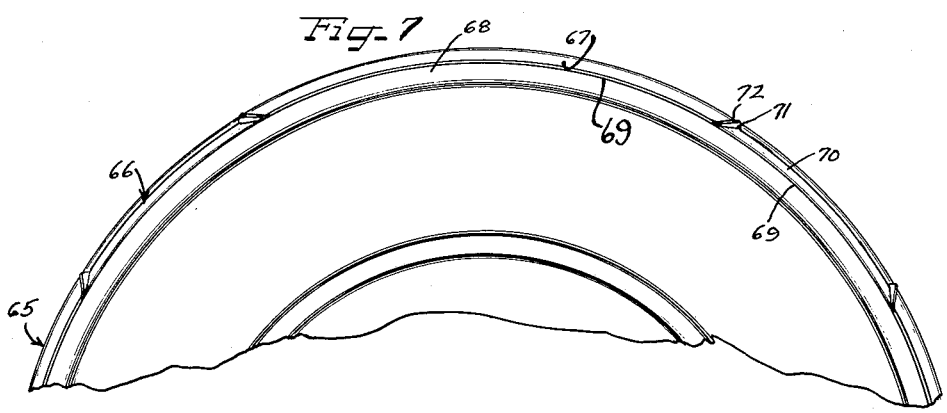
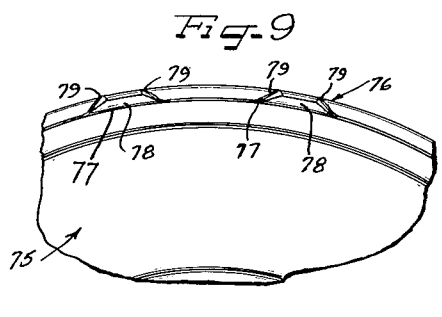
Inventor
GEORGE ALBERT LYON
by Hill, Sherman, Meroni, Gross & Simpson
Attys.

United States Patent Office 2,989,345
Patented June 20, 1961

2,989,345
WHEEL COVER
George Albert Lyon, 13881 W. Chicago Blvd.
Detroit, Mich.
Filed July 27, 1956, Ser. No. 600,521
9 Claims. (Cl. 301—37)

This invention relates generally to a wheel structure and more particularly to new and improved means for maintaining an ornamental cover member in protective retained overlying disposition upon the vehicle wheel.

At the present time, wheel manufacturers are contemplating manufacturing vehicle wheels having a tire rim provided with a terminal rim flange having an annular generally radially inwardly extending lip thereon. The present invention is particularly directed to a new and improved retaining finger for cooperating with a tire rim of this type. The instant finger construction has been found to develop a highly advantageous coaction with the terminal rim flange and lip such that the cover may be very readily and effectively engaged and disengaged from the wheel as opposed to former finger constructions.

Accordingly, an object of this invention is to provide a new and improved resilient self-retaining finger construction for cooperation between a cover and wheel in the maintenance of the cover upon the wheel.

Still another object of this invention is to provide a new and improved finger construction having an increased edge surface area.

A further object of this invention is to provide a new and improved finger construction having diverging turned edges at opposite ends of the finger to resist turning of the cover when applied to a vehicle wheel.

Yet another object of this invention is to provide a new and improved finger construction for maintaining the cover in assembly with the wheel and more particularly behind an annular lip on a stepped multi-flanged tire rim.

A still further object of this invention is to provide a new and improved retaining finger construction which lends itself to economical manufacture on a large production basis and is adapted to effectively cooperate in the maintenance of a cover member upon a vehicle wheel.

According to the general features of this invention there is provided in a wheel structure, a wheel having a flanged tire rim including junctioned radial and axial rim flanges, the axial rim flange having a turned lip, a wheel cover member in overlying retaining disposition upon the wheel and having on the underside circumferentially spaced resilient cover retaining fingers arranged in a common circle having a diameter slightly larger than the inside surface of the axial rim flange, each of the fingers including an axial base portion with a returned bent radially and axially outwardly extending finger portion overlying the base portion, the finger portion being reinforced by radially turned edges which fingers are adapted to be retainingly engaged behind the lip on the axial rim flange.

Another feature of this invention relates to providing a finger having a circumferentially elongated finger portion with turned edges at opposite ends thereof.

Still another feature of this invention relates to providing a finger construction having axial biased edges turned over an axial portion so as to be floatingly carried thereby.

Other objects and features of the invention will become more fully apparent in view of the following detailed description taken in conjunction with the accompanying sheets of drawings illustrating therein several embodiments and in which:

FIGURE 1 is a side elevation of my wheel structure;
FIGURE 2 is an enlarged fragmentary cross-sectional view taken on substantially the line II—II of FIGURE 1 looking in the direction indicated by the arrows;
FIGURE 3 is an enlarged fragmentary rear elevation of the cover shown in FIGURES 1 and 2;
FIGURE 4 is an enlarged fragmentary edge or side elevation of the cover shown in FIGURE 2;
FIGURE 5 is an enlarged fragmentary cross-sectional view similar to FIGURE 2 only illustrating a modified finger construction;
FIGURE 6 is an enlarged fragmentary edge or side elevation of still another modified cover and finger construction;
FIGURE 7 is an enlarged fragmentary rear elevation similar to FIGURE 3 only showing a modified finger construction;
FIGURE 8 is an enlarged fragmentary edge or side elevation similar to FIGURE 2 only showing yet another modified finger construction; and
FIGURE 9 is an enlarged fragmentary rear elevation of the cover shown in FIGURE 8.

As shown on the drawings:

The reference numeral 10 indicates generally my wheel structure which comprises a wheel having connected together body and rim parts 11 and 12, respectively. The body part 11 has a bolt-on flange 13 with apertures 14 therethrough. The bolt-on flange is adapted to be centered with respect to an axle of an automobile vehicle. Lugs carried by the axle (not shown) are adapted to be inserted through the apertures 14 so that nuts may be threaded onto the lugs to clamp the body part to the axle.

The tire rim 12 is of a conventional multi-flange drop center type and includes a generally radially outwardly extending tire rim flange 15 which terminates in an axially extending terminal flange 16. The terminal rim flange 16 is provided with an annular lip 17 behind which generally at the junction of the rim flanges 15 and 16 is located an annular grooved rim portion 18.

Carried upon the wheel is a conventional tire assembly 19 which may be inflated by inserting air through inlet valve 20. The tire assembly 19 may be either of the tube or tubeless type.

Carried upon the wheel in overlying relation is my ornamental protective wheel cover member 25. The cover member 25 includes a central crown 26 including an annular rib 27 at the perimeter of the crown 26. The rib 27 is connected to a generally radially outwardly axially inwardly intermediate cover portion 28 which is, in turn, connected to outer cover margin 29. The cover margin 29 is positioned generally opposite the terminal rim flange 16 and in the present instance has an underturned annular cut out or interrupted flange 30 extending generally radially inwardly and underlying the margin 29.

Integral with the annular flange 30 are circumferentially spaced resilient cover retaining fingers 31 which may be arranged with three fingers at each of the four corners of the cover blank. Each of the fingers includes a generally axial base portion 32 which is widened at its junction with the annular flange 30 and which base portion is progressively tapered generally axially inwardly from the junction. The base portion 32 is return bent at its outer end to provide a generally axial finger portion 33 which in the present instance extends slightly radially outwardly. At opposite ends of the finger portion 33 are generally obliquely and radially outwardly extending turned stiffening wing-like cover portions 34. The finger 31, and more particularly the turned portions 34, has curved edges or edge surfaces or finger edges or turned edges 35 which are adapted to retainingly bite against the inside surface of the terminal rim flange 16 and more particularly behind the annular lip 17.

As is evident in FIGURE 4, the curved edges 35 extend in a divergent biased angle to one another and are especially adapted when assembled upon the wheel to resist turning of the cover relative to the wheel. These curved edges 35 engage over an increased area, as opposed to conventional finger constructions, against the inside surface of the terminal rim flange 17. Since the edge 35 has an extended distance to travel over the lip 17 before bottoming therebehind, by curving the edge surface 35, the forces exerted by the finger 31 are distributed over a greater surface area and thereby enable the finger to be more readily engaged and disengaged from behind the lip or bump 17.

To assemble the cover 25 upon the wheel, the cover and more particularly the cover opening 36 is aligned with the valve stem 20 with the cover being advanced toward the wheel so that the valve stem 20 extends through the cover opening 36. Upon the application of additional force against the cover margin 29, the finger edges 35 are progressively cammed over the lip 17 until they snap into engagement behind the lip 17 in engagement with the terminal rim flange 16. To back up the engagement of the edges 35 behind the lip 17, the finger 31 is bottomed at 37 against the tire rim flange 15. It is in this manner that distortion of the finger 31 may be minimized when the cover and wheel is, for example, suddenly and abruptly engaged against a curbstone or the like.

One way to remove the cover 25 from the wheel is to insert a suitable pry-off tool 38 between the turned edges 35—35 and upon the application of a suitable force, the fingers 31 may be disengaged and released from the tire rim. The turned portions 34—34 act as guides in the application of the tool 38 against the finger 31.

The fingers 31 are arranged in a common circle having an outside diameter slightly larger than the inside diameter of the terminal rim flange 16 thereby facilitating the development of a retaining action between the fingers and tire rim.

In FIGURE 5 is shown a modified cover construction 40 having an outer margin 41. The margin 41 has an underturned annular flange 42 which underlies the margin 41. Connected to the flange 42 at circumferentially spaced intervals are self-retaining spring fingers 43. The fingers 43 include a generally axially extending portion 44. The portion 44 has connected at its outer end a curved finger portion 45 which is return bent and overlies the portion 44. The portion 45 is turned at its circumferentially spaced opposite ends to provide stiffening wing-like cover portions 46 to reinforce the finger 43.

In the application of the cover 40 to the wheel, due to the relative differences in the inside diameter of the tire rim and the outside diameter of the fingers 43, a retaining action may be developed upon the camming of the curved finger portion 45 over and behind the lip 17 into the annular groove 18 with the junction of the finger portions 44 and 45 being bottomed against the rim flange 15 to back up the engagement thereof. By reinforcing the cover portion 45 and curving its edge surface so that an increased area is engaged behind the lip 17 against the rim, the finger may be very readily and effectively engaged and released from behind the lip 17 in much the same manner as in the first form of my invention (FIGURES 1–4).

The reference numeral 56 in FIGURE 6 indicates generally still another form of my invention wherein fingers 31 which are of the same type shown in FIGURES 1–3 and emanate from a continuous annular flange 57 as opposed to the interrupted flange 30 shown in FIGURE 4. The flange 57 of FIGURE 6 has been also found to be effective and the cover 56 is cheaper than the cover 25 to manufacture since the extra step of cutting out the flange 30 (FIGURE 4) is obviated.

Shown in FIGURE 7 is still another modified cover 65.

The cover 65 has a modified finger 66 which is connected at circumferentially spaced intervals thereon. Due to the particular configuration of the finger 66, only four fingers need be used to effectively maintain the cover upon the wheel. The cover 65 is constructed in much the same manner as the cover 25 and includes a generally radially inwardly extending cover portion 67 which underlies outer cover margin 68. Connected to the underlying cover portion 67 is a generally axially inwardly extending continuous annular finger base portion 69. Return bent to overlie the base portion 69 is a generally axially extending finger portion 70 which is elongated circumferentially as opposed to the corresponding finger portion 31 (FIGURES 1–4). Disposed at opposite circumferentially spaced ends of the portion 70 is generally radially outwardly obliquely extending wing-like stiffening portions 71. The portions 71 have a curved surface 72 and extend divergently of one another. By circumferentially elongating the finger portion 70, a single set of turned finger portions 72 on each of four circumferentially spaced locations on the cover may be utilized to maintain the cover 65 upon the wheel. It will be appreciated that the turned portions 72 are constructed in much the same manner as the turned portions 34 shown in FIGURE 3 and are adapted to cooperate with the tire rim in much the same manner.

In FIGURES 8 and 9 is shown yet another modified wheel cover 75. The cover 75 is constructed the same as cover 25 except that a modified retaining means 76 has been here utilized. The retaining means or fingers 76 have a base portion 77. The base portion 77 is widened at its junction with the cover 75 and narrowed at its junction with return bent generally radially and axially extending finger portion 78. Circumferentially opposite ends of the finger portion 78 are angled and turned radially outwardly and away to provide axially extending wing-like stiffening portions 79. The turned portions 79 have a curved surface and are adapted to cooperate in much the same manner with a tire rim as in the first form of my invention except in this instance edge surfaces 80 of turned portions 79, which are the surfaces that are to engage with the tire rim, extend in generally the same axial relation with respect to one another and are not divergent as with the first form of my invention.

The assembly and removal of the modified covers shown in FIGURES 5–9 may be effected in much the same manner as cover 25 in FIGURES 1–4.

The fingers have been positioned generally at four circumferentially spaced intervals in all forms of my invention thereby utilizing the cover material at the four corners of the cover blank to keep the blank size to a minimum. Obviously, however, the fingers could be positioned in many different ways without departing from the scope of this invention.

In all forms of my invention, the cover may be made from any suitable material such as stainless steel and the like.

The present application for patent is a continuation-in-part of my earlier copending application Serial No. 411,436, which is now issued into Patent No. 2,857,208. The effective date of my earlier filed patent application is December 3, 1951.

It will be understood that modifications and variations may be effected without departing from the scope of the novel concepts of the present invention.

I claim as my invention:

1. In a wheel structure, a wheel having a flanged tire rim including junctioned radial and axial rim flanges, said axial rim flange having a turned lip, a wheel cover member in overlying retained engagement upon the wheel and having on the underside circumferentially spaced resilient cover retaining fingers, each of said fingers including an axial base portion with a return bent radially and axially outwardly extending finger portion overlying said base portion, said return bent finger portions being reinforced by having circumferentially spaced edges thereon which are angled away from said return bent finger portion which fingers are adapted to be retainingly engaged behind said lip on said axial rim flange, said angled edges extending divergently of one another for biased engagement with said axial rim and to resist turning of the cover on the wheel.

2. In a wheel structure, a wheel having a flanged tire rim including junctioned radial and axial rim flanges, said axial rim flange having a turned lip, a wheel cover member in overlying retained engagement upon the wheel and having on the underside circumferentially spaced resilient cover retaining fingers, each of said fingers including an axial base portion with a return bent radially and axially outwardly extending finger portion overlying said base portion, said finger portion being reinforced by having circumferentially spaced edges thereon which are angled away from said return bent finger portion which spaced edges are adapted to be retainingly engaged behind said lip on said axial rim flange, said edges being turned radially outwardly and circumferentially spaced on each of said fingers and providing guides to aid in the insertion of a pry-off tool between said rim and finger portion for releasing said turned edges from engagement with the wheel.

3. In a wheel structure, a wheel having a flanged tire rim including junctioned radial and axial rim flanges, said axial rim flange having a turned lip, a wheel cover member in overlying retained engagement upon the wheel and having on the underside circumferentially spaced resilient cover retaining fingers, each of said fingers including an axial base portion with a return bent radially and axially outwardly extending finger portion overlying said base portion, said return bent finger portion being reinforced by having circumferentially spaced edges thereon which are angled and turned away from said flange portion which spaced edges are adapted to be retainingly engaged behind said lip on said axial rim flange, said angularly turned radial finger edges being rounded and engaged behind said lip to increase the edge surface area in engagement with the rim to aid in the movement of the finger edges over said lip.

4. In a wheel structure, a wheel having a flanged tire rim including junctioned radial and axial rim flanges, said axial rim flange having a turned lip, a wheel cover member in overlying retained engagement upon the wheel and haivng on the underside circumferentially spaced resilient cover retaining fingers, each of said fingers including an axial base portion with a return bent radially and axially outwardly extending finger portion overlying said base portion, said return bent finger portion being reinforced by having its edges turned and angled away from the return bent finger portion which fingers are adapted to be retainingly engaged behind said lip on said axial rim flange, said turned edges extending divergently of one another for biased engagement with said axial rim and to resist turning of the cover on the wheel, said turned divergent finger edges being rounded and engaged behind said lip to increase the edge surface area in engagement with the rim and further resist turning of the cover on the wheel.

5. In a wheel structure, a wheel having a flanged tire rim including junctioned radial and axial rim flanges, said axial rim flange having a turned lip, a wheel cover member in overlying retained engagement upon the wheel and having on the underside circumferentially spaced resilient cover retaining fingers, the fingers being arranged in a common circle having a diameter slightly larger than the inside surface of the axial rim flange, each of said fingers including an axial base portion with a return bent radially and axially outwardly extending finger portion overlying said base portion, said return bent finger portion each including a generally radially and axially inclined flange portion having circumferentially spaced wing-like cover portions each having a radially facing edge which edges are angled and turned away from said flange portion, the wing-like cover portions being retainingly engaged behind the lip on the axial rim flange, the return bent finger portion being elongated circumferentially and being spaced from the axial rim flange by said wing-like cover portions.

6. In a wheel structure including a multi-flange tire rim and a wheel body supporting the tire rim, a circular wheel cover for disposition over the outer side of the wheel, provided with a radially outer portion for overlying the tire rim, and having means for retaining the cover in predetermined position on the wheel against both axial and circumferential displacement, said means including a circumferential series of portions behind the radially outer cover portion provided with substantially sharp cut edges angled generally toward the tire rim for engagement of substantially radially outwardly offset retaining portions of the edges in tensioned biting gripping relation with an opposing surface of the tire rim, certain of said sharp edges being directed generally in one circumferential direction and others of the sharp edges being directed generally in the opposite circumferential direction so as to retain the cover against torque-induced turning displacement in either rotary direction of revolution of the wheel in service, the tire rim including a terminal rim flange which flange has a radially inner annular curved rim surface end and an annular terminal rim shoulder disposed at the axially outer end of the annular curved rim surface, said circumferential series of portions each comprising a resilient retaining return bent finger including a generally axially extending base portion and a return bent portion angled with respect to and overlying the base portion with said return bent portion having said sharp edges thereon angled and turned away from said return bent portion, said sharp edges being removably engaged with the annular curved rim surface axially behind said terminal rim shoulder.

7. In a wheel structure including a multi-flange tire rim and a wheel body supporting the tire rim, a circular wheel cover for disposition over the outer side of the wheel, provided with a radially outer portion for overlying the tire rim, and having means for retaining the cover in predetermined position on the wheel against both axial and circumferential displacement, said means including a circumferential series of portions behind the radially outer cover portion provided with substantially sharp cut edges angled generally toward the tire rim for engagement of substantially radially outwardly offset retaining portions of the edges in tensioned biting gripping relation with an opposing surface of the tire rim, certain of said sharp edges being directed generally in one circumferential direction and others of the sharp edges being directed generally in the opposite circumferential direction so as to retain the cover against torque-induced turning displacement in either rotary direction of revolution of the wheel in service, said circumferential series of portions each comprising a resilient retaining return bent finger including a generally axially extending base portion and a return bent portion angled with respect to and overlying the base portion with said return bent portion having said sharp edges thereon angled and turned away from said return bent portion.

8. In a wheel structure, a wheel and a wheel cover member for disposition upon the wheel, circumferentially spaced resilient self-retaining return bent type fingers on the cover member to maintain the cover in disposition upon the wheel, said fingers each having a generally axially extending base and a return bent portion angled with respect to and overlying the base with said return bent portion having edge portions thereon angled and turned away from said base portion and said return bent portion toward the wheel, said edge portions being engaged with the wheel to sustain the cover in assembly on the wheel.

9. In a wheel structure including a multi-flange tire rim and a wheel body supporting the tire rim, a circular wheel cover for disposition over the outer side of the wheel, provided with a radially outer portion for overlying the tire rim, and having means for retaining the cover in predetermined position on the wheel against both axial and circumferential displacement, said means including an annular flange structure carried by the cover and concealed behind said radially outer portion of the cover for opposing the tire rim, said flange structure having a circumferential series of portions thereon integral in one piece therewith provided with substantially sharp cut edges angled generally toward the tire rim for engagement in tensioned biting gripping relation with an opposing surface of the tire rim, some of said sharp edges being directed generally in one circumferential direction and others of the sharp edges being directed generally in the opposite circumferential direction so as to retain the cover against torque-induced turning displacement in either rotary direction of revolution of the wheel in service, said circumferential series of portions each comprising a resilient retaining return bent finger including a generally axially extending base portion and a return bent portion angled with respect to and overlying the base portion with said return bent portion having said cut edges thereon angled and turned away from said return bent portion.

References Cited in the file of this patent
UNITED STATES PATENTS

| | | |
|---|---|---|
| 1,800,173 | Anderson | Apr. 7, 1931 |
| 2,006,747 | Ritz-Woller | July 2, 1935 |
| 2,404,389 | Lyon | July 23, 1946 |
| 2,624,627 | Lyon | Jan. 6, 1953 |
| 2,683,631 | Lyon | July 13, 1954 |
| 2,686,082 | Lyon | Aug. 10, 1954 |
| 2,690,358 | Lyon | Sept. 28, 1954 |
| 2,698,203 | Landell | Dec. 28, 1954 |
| 2,732,262 | Buerger | Jan. 24, 1956 |

FOREIGN PATENTS

| | | |
|---|---|---|
| 718,346 | Great Britain | Nov. 10, 1954 |
| 744,837 | Great Britain | Feb. 15, 1956 |